(12) United States Patent
Richey et al.

(10) Patent No.: US 7,254,524 B1
(45) Date of Patent: Aug. 7, 2007

(54) METHOD AND SYSTEM FOR A SIMULATION AUTHORING ENVIRONMENT IMPLEMENTED IN CREATING A SIMULATION APPLICATION

(75) Inventors: Steven Richey, Santa Clara, CA (US); Maruthachala Mandiram Ponnambalam, Chennai (IN)

(73) Assignee: Cisco Technology, Inc., San Jose, CA (US)

( * ) Notice: Subject to any disclaimer, the term of this patent is extended or adjusted under 35 U.S.C. 154(b) by 652 days.

(21) Appl. No.: 09/904,982

(22) Filed: Jul. 12, 2001

(51) Int. Cl.
*G06F 9/45* (2006.01)
*G06F 11/00* (2006.01)
*G06F 15/16* (2006.01)
*H03M 13/00* (2006.01)

(52) U.S. Cl. .................... 703/22; 714/38; 714/776; 709/200

(58) Field of Classification Search .................. 703/22; 714/776, 38
See application file for complete search history.

(56) References Cited

U.S. PATENT DOCUMENTS

| | | | |
|---|---|---|---|
| 5,752,008 A * | 5/1998 | Bowling | 703/13 |
| 5,923,867 A * | 7/1999 | Hand | 703/14 |
| 6,108,309 A * | 8/2000 | Cohoe et al. | 370/241 |
| 6,170,075 B1 * | 1/2001 | Schuster et al. | 714/776 |
| 6,505,149 B1 * | 1/2003 | Griswold et al. | 703/14 |
| 6,539,498 B1 * | 3/2003 | Sato | 714/38 |
| 6,611,253 B1 * | 8/2003 | Cohen | 345/168 |

* cited by examiner

*Primary Examiner*—Anthony Knight
*Assistant Examiner*—Tom Stevens
(74) *Attorney, Agent, or Firm*—Marger Johnson & McCollom, P.C.

(57) ABSTRACT

A method and system for creating a simulation authoring environment. Specifically, the present invention discloses a method and system for creating a simulation application that simulates a real-life interaction with a network device. In one embodiment, a real command-line interface with the device is monitored at a server computer. The interface, including the line-commands and their outputs are captured. The line-commands for the particular communication sequence are summarized and grouped into steps. Also, the line-commands can be edited. New line-commands can also be introduced into the communication sequence. Additionally, the server computer re-executes the communication sequence in order to determine all the valid permutations associated with the communication sequence. A simulation application is generated such that the simulation application presents real-life outputs to command-line inputs in an instructional exercise format.

53 Claims, 8 Drawing Sheets

| CME No. | Device | Mode | Command |
|---|---|---|---|
| 1 | cna-cs | User Exec | sh ver |
| 2 | - | - | EXTERNAL_EVENT |
| 3 | - | - | EXTERNAL_EVENT |
| 4 | cna-cs | User Exec | sh ip route |
| 5 | - | - | EXTERNAL_EVENT |
| 6 | - | - | EXTERNAL_EVENT |
| 7 | cna-cs | Priv Exec | prtv show |
| 8 | - | - | EXTERNAL_EVENT |
| 9 | cna-cs | User Exec | sh traffic |
| 10 | cna-cs | User Exec | sh terminal |
| 11 | cna-cs | User Exec | sh users |
| 12 | cna-cs | User Exec | cna-r3 |
| 13 | SpAT3 | User Exec | sh ver |
| 14 | SpAT3 | User Exec | sh ip route |
| 15 | SpAT3 | User Exec | sh traffic |
| 16 | cna-cs | User Exec | sdf df |
| 17 | SpAT3 | User Exec | sh terminal |
| 18 | cna-cs | User Exec | ena |
| 19 | cna-cs | User Exec | cna rf |
| 20 | SpAT1 | User Exec | ena |
| 21 | SpAT1 | Priv Exec | conft |
| 22 | SpAT1 | config | int e 0 |
| 23 | SpAT1 | config-if_et... | ? |
| 24 | SpAT1 | config-if_et... | no shut |
| 25 | SpAT1 | config-if_et... | nl ip address |
| 26 | SpAT1 | config-if_et... | no ip address |

Fig. 3

| Step No. | CME No. | Device | Mode | Command |
|---|---|---|---|---|
| 1 | 1 | cna-cs | User Exec | sh ver |
| 1 | 2 | - | - | EXTERNAL_EVENT |
| 1 | 3 | - | - | EXTERNAL_EVENT |
| 1 | 4 | cna-cs | User Exec | sh ip route |
| 1 | 5 | - | - | EXTERNAL_EVENT |
| 1 | 6 | - | - | EXTERNAL_EVENT |
| 1 | 7 | cna-cs | Priv Exec | priv show |
| 1 | 8 | - | - | EXTERNAL_EVENT |
| 2 | 9 | cna-cs | User Exec | sh traffic |
| 2 | 10 | cna-cs | User Exec | sh terminal |
| 3 | 11 | cna-cs | User Exec | sh users |
| 3 | 12 | cna-cs | User Exec | cna-r3 |
| 3 | 13 | SpAT3 | User Exec | sh ver |
| 3 | 14 | SpAT3 | User Exec | sh ip route |
| 3 | 15 | SpAT3 | User Exec | sh traffic |
| 3 | 16 | cna-cs | User Exec | sdf df |
| 3 | 17 | SpAT3 | User Exec | sh terminal |
|  | 18 | cna-cs | User Exec | ena |
|  | 19 | cna-cs | User Exec | cna rf |
|  | 20 | SpAT1 | User Exec | ena |
|  | 21 | SpAT1 | Priv Exec | conft |
|  | 22 | SpAT1 | config | int e 0 |
|  | 23 | SpAT1 | config-if_et... | ? |
|  | 24 | SpAT1 | config-if_et... | no shut |
|  | 25 | SpAT1 | config-if_et... | nf ip address |
|  | 26 | SpAT1 | config-if_et... | no ip address |

Fig. 4

METHOD AND SYSTEM FOR A SIMULATION AUTHORING ENVIRONMENT IMPLEMENTED IN CREATING A SIMULATION APPLICATION

BACKGROUND OF THE INVENTION

1. Field of the Invention

The present invention relates to the field of simulation applications. Specifically, the present invention relates to the field of creating simulation applications.

2. Related Art

Simulation applications are used extensively as effective learning tools. Without the full expenditure of purchasing real equipment, simulation applications can provide interactive learning environments with the benefits of a realistic simulation in a controlled format.

For example, in the field of Internet networking technology, various simulation tutorials have been designed to extend, enhance, and test internetworking knowledge using a variety of protocols and commands in a simulated environment. Configuration and troubleshooting labs are integrated into the simulation tutorials to allow users to interact with the command-line interface in a simulated virtual network environment of routers, switches, or other network devices. No actual hardware connection is required in a simulation application environment.

Each of the simulation applications is directed at a specific networking technology, such as ISDN, LAN switching, voice technology, and others. The simulation application controls the learning experience by focusing on a particular skill in a particular technology. For example, the simulation application can be used to provide a practical understanding of specific configuration and troubleshooting principles dependent on the technology being taught. Commands needed to support the skill building of these principles are taught in the simulator applications.

The simulator application can provide a realistic command-line interface experience as long as the user stays within the guided parameters of the exercise. For example, attempting to configure a router to use AppleTalk will not be possible if the purpose of the exercise is to configure TCP/IP. However, by staying within the guided parameters of the simulation exercise, a user can practice router initialization, status evaluation, password recovery, updating of software images, and TCP/IP and Routing Information Protocol (RIP) configurations.

Additionally, each of the simulation applications is designed around the actual command-line interface of real scenarios. An effective simulation application will provide the identical command-line interface as encountered in the real scenario. As such, a subject matter expert (SME) interacts with a particular networking equipment that is specific to the simulation application tutorial in order to determine the actual responses or outputs in a real scenario.

The SME, at an end device, interfaces with the network device. Usually, a direct Telnet connection between the end device and the network device provides the necessary network architecture. Also, if the connection is via the Internet or a local area network, the intervening server computer's only function is to pass along the communication between the end device and the network device.

However, the SME must go through each of the possible permutations in the command-line interface. Many of the command-line interfaces are not linear in that commands can be executed in various orders, resulting in multiple permutations of a command-line interface. In order to provide a thorough and effective simulation, each of the permutations must be either known by the SME, or at the very least executed by the SME. Attempting every possible permutation is time-consuming and detail oriented: some permutations may be overlooked by the SME. This results in lost permutations that are not enabled in the simulation application.

Furthermore, in the past, the subsequent interaction for the command-line interface is written into a large file, and then given to simulation application developers who write the source code for the simulation application. Putting the interface in an organized manner that is easily translated into a series of commands in a command-line interface can be difficult and time-consuming.

Additionally, the process to produce the simulation application is subject to error and time consuming, since the file containing the command-line interface must be re-entered into the source code for the simulation applications. Many iterations in creating the simulation application are needed to ensure that the simulation application provides the same command-line interface as encountered in a real scenario.

Also, transferring the format and vision of the course developer, or SME, to a simulation application developer in order to capture the correct and style and format of the simulation application can be very difficult, especially if the SME and the application developer are not co-located. Without much discussion, the simulation application developer cannot visualize the exact format the course developer wants to portray in the simulation environment.

Thus, it would be advantageous to provide a more efficient method and system for creating simulation applications. Also, it would be advantageous to simplify the process of creating simulation applications such that a subject matter expert, who may not understand how to develop an instructional course, can easily create a simulation application. Also, it would be advantageous to standardize the process of creating simulation applications.

SUMMARY OF THE INVENTION

Accordingly, a method and system for a simulation authoring environment is described. The present invention provides a more efficient method and system for creating a simulation application. Also, the present invention simplifies the creation of the simulation application, such that a subject matter expert can easily create a simulation application that is an instructional tool. Additionally, the present invention provides for a standardized and simplified process for the creation of simulation applications.

Specifically, the present invention discloses a method and system for a simulation authoring environment. In one embodiment, the present invention discloses a method for creating a simulation application that simulates a real-life interaction with a network device. A real command-line interface with the device is monitored at a server computer during a communication sequence. The interface, including the line-commands and their outputs are captured. The line-commands for the interface are entered by a user, a subject matter expert or course developer, at an end device that is coupled to the real network device via the server computer.

The line-commands for the particular communication sequence are summarized and grouped into steps. Also, the line-commands can be edited. New line-commands can also be introduced into the communication sequence. Additionally, the server computer re-runs the communication sequence in order to determine all the valid permutations associated with the communication sequence. Then, a simulation application is generated such that the simulation application presents real-life responses or outputs to command-line inputs in an instructional exercise format.

In one embodiment, the server computer has the intelligence to summarize and provide a list of the line-commands along with a corresponding description back to the course developer at the end device. The line-commands can then be organized into a series of steps, such that the entire communication sequence can be broken down into a series of steps. Each step includes at least one of the line-commands associated with the communication sequence.

In another embodiment, the line-commands in a step can be executed in a non-linear manner, such that the line-commands need not be executed in a particular order. This gives rise to multiple possible permutations for the communication interface associated with the communication sequence. However, the series of steps still must be executed in a linear manner.

In still another embodiment, the server computer re-executes each of the line commands associated with a communication sequence. The server computer queries the network device for the full syntax of the line-command. Additionally, the server computer automatically executes all of the possible permutations associated with the communication sequence. The server computer can distinguish between valid and invalid line-commands in a particular permutation. The server computer monitors and captures each of the line-commands and outputs for each of the different permutations to be presented in the resulting simulation application.

The server computer recognizes the input of information regarding each of the steps in the communication sequence, in another embodiment. Step text and step detail can be introduced into the simulation application by a course developer. The step text provides a short technical description of the particular step. The step detail provides detailed instructions and information regarding the particular step.

In another embodiment of the present invention, a simulation application is generated in the form of an instructional exercise. The simulation application is an exercise that simulates a real-life interaction, such as when configuring or trouble-shooting, with a real device in a simulated environment. The simulation application presents real-life outputs to command-line inputs as captured by the server computer in running the communication sequence. The real-life outputs are presented along with the step text and the step detail in an instructional exercise format.

In another embodiment, a server computer provides the necessary interface between a course developer and the real device in order to implement the method of authoring a simulation environment application. A course developer connects with a web site in order to create a simulation application. The web site at the server controls the entire communication interface between the course developer and the network device in order to generate the simulation application.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

FIG. 3 illustrates a table listing all the line-commands for a particular communication sequence as created by a subject matter expert, in accordance with an embodiment of the present invention.

FIG. 4 illustrates a table showing the grouping of the line-commands into a series of steps in a communication sequence, in accordance with an embodiment of the present invention.

DETAILED DESCRIPTION OF THE INVENTION

Figure 1:
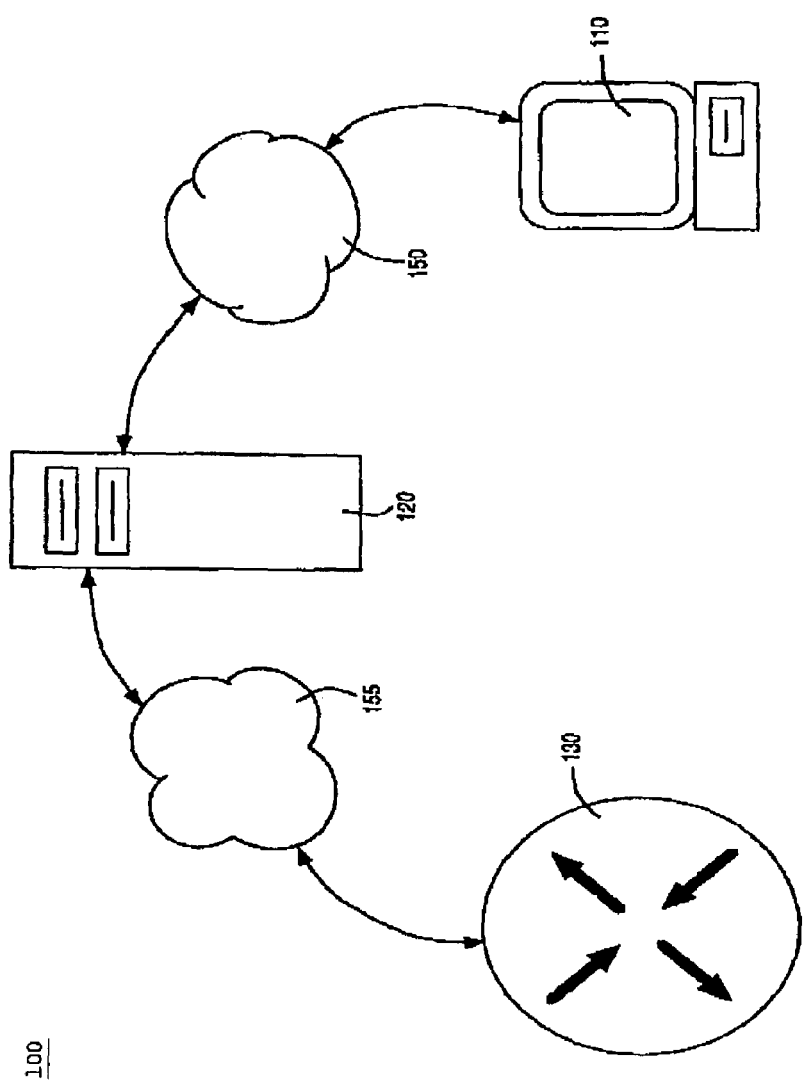
FIG. 1 illustrates a block diagram of an exemplary network environment including a server computer coupled to a networking device and an end device, in accordance with an embodiment of the present invention.

Reference will now be made in detail to the preferred embodiments of the present invention, a method and system for a simulation authoring environment, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Simulation Authoring Environment

Accordingly, a method and system for a simulation authoring environment is described. The present invention provides a more efficient method and system for creating a simulation application. Also, the present invention simplifies the creation of the simulation application, such that a subject matter expert can easily create a simulation application that is an instructional tool. Additionally, the present invention provides for a standardized and simplified process for the creation of simulation applications.

The simulation authoring environment creates simulation applications used in a wide range of technological fields. Simulation tutorials have been designed to extend, enhance, and test internetworking knowledge using a variety of protocols and commands in a simulated environment. Configuration and troubleshooting exercises are integrated into the simulation tutorials to allow users to interact with the command-line interface in a simulated virtual network environment of routers, switches, or other network devices. No actual hardware connection is required in a simulation application environment.

Each of the simulation applications can be directed at a specific networking technology, such as ISDN, LAN switching, voice technology, and others. The simulation application controls the learning experience by focusing on a particular skill in a particular technology. For example, the simulator can be used to provide a practical understanding of specific configuration and troubleshooting principles dependent on the technology being taught. Commands needed to support the skill building of these principles are taught in the simulator applications.

Although embodiments of the present invention are described with respect to networking technology and the interface with networking devices, it is appreciated that the simulation authoring environment of the present invention can be used to produce simulation applications for a wide range of technological fields, and in any environment where a communication interface occurs between two electronic devices.

FIG. 1 illustrates the simulation authoring environment used to create simulation applications in accordance with one embodiment of the present invention. The network 100 includes a server computer 120 that is coupled to a network device 130. The network device 130 shown in FIG. 1 is a router, but can be any networking device, such as a local area network (LAN) switch or wide area network (WAN) switch. In one embodiment, the device 130 is any device capable of operating the Cisco Internet Operating System (IOS)™.

Continuing with FIG. 1, an end device 110 is shown where an end user can access the network device 130 through network 100. The end user is usually a subject matter expert (SME) or a course developer who is knowledgeable in the interface protocols particular to the network device 130. Also, the SME is knowledgeable in the particular scenario the simulation application is trying to simulate, or replicate, or mimic.

The end device 110 is coupled to server computer 120 through a communication network 150. Similarly server computer 120 is coupled to network device 130 via communication network 155. In one embodiment, end device 110 is coupled to server computer 120 via a Telnet connection over network 150. Also, server computer 120 is coupled to network device via a Telnet connection over network 155. It is appreciated that networks 150 and 155 can be any communication network capable of transferring communications protocol, including Internet networks, direct landlines, local area networks, etc.

An application located at the server computer 120 controls the entire process in creating a simulation application in the simulation authoring environment in one embodiment of the present invention. Because the communication interface passes through the server computer 120, the data and communication can be processed at the server computer 120. In one implementation, the simulation authoring environment contains a specification authoring tool (SpAT) or application located at the server that is capable of controlling the creation of a simulation application.

In the network 100 of the network authoring environment, the server computer 120 communicates directly with the network device 130 to run the communication interface. The SME at the end device 110, through a Java applet loaded at the web browser contained in end device 110, sends the commands necessary for the communication interface to the server computer 120.

In another embodiment of the present invention, the server computer 120 can analyze the communication interface in order to check for errors in the line-commands in a particular communication sequence. A communication sequence is a group of line-commands sent by a SME to a network device to accomplish a specific objective, such as a frame relay backbone configuration. This objective is the scenario presented to the SME for replication. For example, the server computer can analyze the data coming back from the network device to see if a specific line-command was invalid. An explanation can also be provided by the server computer 120 and sent back to the SME at the end device 110.

In still another embodiment of the present invention, the server computer has the intelligence to flag specific items that are of particular interest. For example, if in a particular communication sequence, a response comes back that states "15 carrier transitions." Instead of the user going to a book to look up the definition, the server computer can flag the response, highlight the particular response and provide a hyperlink to a data library that contains an explanation of that particular response. Other hyperlinks can be added that could lead to product advertisements, further definitions, other web sites, etc.

Additionally, the server computer can have the intelligence to provide assistance in various network operations.

For example, an application can be located at the server computer to assist the user in telnetting to any network device.

Figure 2:
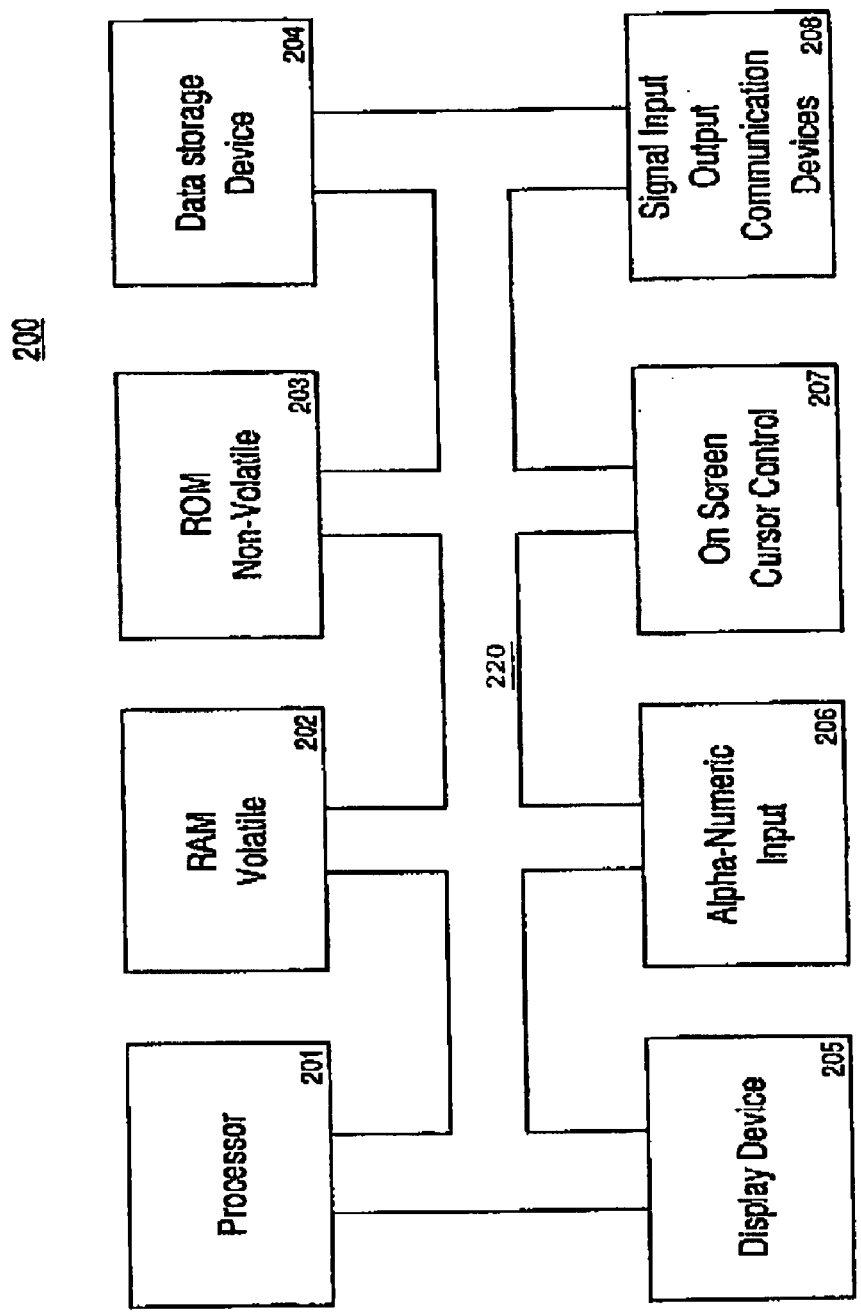
FIG. 2 is a logical block diagram of an exemplary computer system in accordance with an embodiment of the present invention.

Referring now to FIG. 2, a simulation authoring environment system is shown as computer system 200. System 200 can include any computer-controlled software application used in the simulation authoring environment of one embodiment of the present invention for creating simulation applications. System 200 can be a server computer.

In general, computer system 200 comprises an address/data bus or other communication means 220 for communicating information, a central processor 201 coupled with the bus for processing information and instructions, a volatile memory 202 (e.g., random access memory (RAM), static RAM dynamic RAM, etc.) coupled with the bus 220 for storing information and instructions for the central processor 201, a non-volatile memory 203 (e.g., read only memory (ROM), programmable ROM, flash memory, EPROM, EEPROM, etc.) coupled with the bus 220 for storing static information and instructions for the processor 201, a data storage device 204 (e.g., memory card, hard drive, optical disk, etc.) coupled with the bus 220 for storing information and instructions, a display device 205 coupled to the bus 220 for displaying information to the computer user, an alphanumeric input device 206 including alphanumeric and function keys coupled to the bus 220 for communicating information and command selections to the central processor 201, a cursor control device 207 coupled to the bus for communicating user input information and command selections to the central processor 201, and an Input/Output (I/O) device 208 coupled to the bus 220 for providing a communication link between computer system 200 and a network environment.

In the simulation authoring environment, a simulation application is created by having the SME run through an actual communication interface with a network device, in one embodiment of the present invention. A particular communication sequence is executed with line-commands and outputs that focuses on a particular objective relating to the network device. Although the present invention is described using a communication interface that is command-line based, it is appreciated that other embodiments of the present invention can use other communication protocols and interfaces, such as the graphical interface used in windows or in content provider web sites over the Internet.

Referring now to FIG. 3, a summary of the line-commands sent by the SME in a particular communication sequence is shown in table 300. The server computer has the intelligence to monitor the communication between the SME and the network device, capture and store the communication, and then process the information contained within the communication to create a simulation application.

To help the SME or course developer review the commands, a summary is provided in table 300. Column 310 shows the numbering of the commands, from command-line 1 through command-line 26. It is appreciated that table 300 is exemplary only and that other commands may be implemented in any number of communication sequences for any number of objectives, or scenarios.

Also, FIG. 3 shows the specific line-commands that were sent to the network device by the SME in column 330. For example, in row 309, the command-line executed is "sh traffic." The line-command is in an abbreviated form that the SME uses when interfacing with the network device. The abbreviation is for "show traffic." Because of the simulation authoring environment, intelligence in the server computer can query the network device for the full syntax of the line-command, in one embodiment of the present invention. In one embodiment, it is the SpAT tool that queries the network device for the full syntax of the line-command.

FIG. 4 illustrates the grouping of line-commands into a series of steps as is used in the method implemented for creating a simulation application. In FIG. 4, the SME has grouped various line commands into a series of steps. The steps are linear, in that the steps must be performed in a linear order in the communication sequence in order to replicate the scenario that is associated with a particular objective, such as configuring the frame relay backbone. Although the steps must be performed in a linear fashion, the group of line-commands in each of the steps need not be performed in a linear fashion. This leads to numerous permutations of line-commands in a communication sequence that all lead to the same objective in the simulated scenario.

FIG. 4 illustrates the table 400 showing the series of steps. Table 400 is essentially table 300 with the addition of column 410. Column 410 illustrates the grouping of the various line-commands into the series of steps. For example, in step-1 414, line-commands 1 through 8 are grouped together. In step-2 416, line-commands 9 thorough 10 are grouped together. In step-3 418, line commands 11 through 17 are grouped together.

Figure 5:
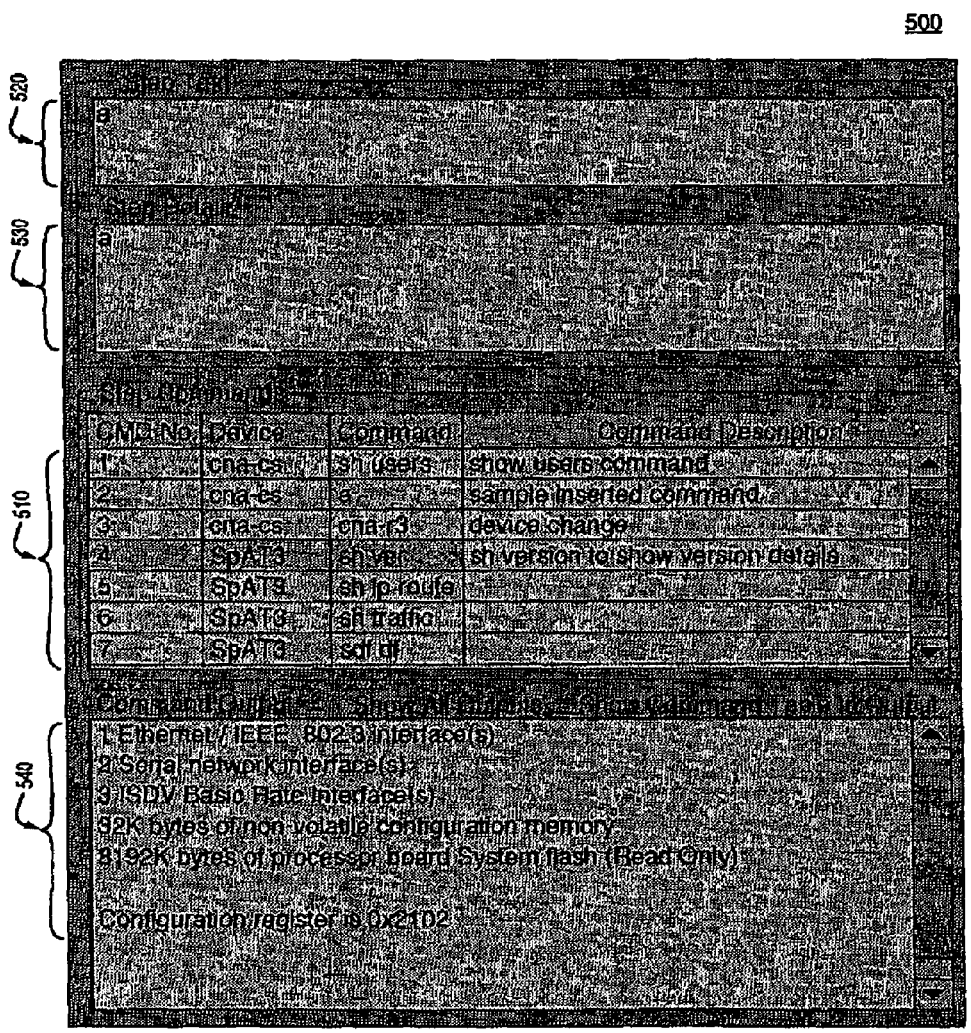
FIG. 5 illustrates a screen shot showing the various informational fields available to a subject matter expert in creating a simulation application, in accordance with an embodiment of the present invention.

FIG. 5 is a screen-shot 500 used in the simulation authoring environment to create a simulation application, in accordance with one embodiment of the present invention. FIG. 5 illustrates the interface between the SME or course developer with the SpAT tool in creating a simulation application. The screen shot 500 is associated with a particular step in a particular communication sequence. In window 510, the various line-commands comprising the particular step are shown.

Window 520 of FIG. 5 allows the SME to enter a technical description of the step. This step text window 520 is incorporated into the exercise tutorial of the simulation application as created by the SpAT tool in the simulation authoring environment, in accordance with one embodiment of the present invention.

Also, window 530 of FIG. 5 allows the SME to enter more detailed instructions as is related to the particular step. For example, in step detail window 530, the SME can provide necessary instruction or information relevant to a user of the simulation application in order for the user to execute the particular step in the communication sequence. This step detail window 530 is incorporated into the exercise tutorial of the simulation application as created by the SpAT tool in the simulation authoring environment, in accordance with one embodiment of the present invention.

In another embodiment of the present invention, developer notes and annotations can be attached as a separate window that is associated with the creation of a simulation application. These notes and annotations aid in reminding the SME or course developer the particular objectives in each of the steps of the communication sequence. This aspect of the SpAT tool is invaluable if there is an extended period of time between the starting and the completion of a simulation application using the simulation authoring environment of the present invention.

In one embodiment of the present invention, a SME can click on particular line command in window 510 in order to obtain further details associated with the line-command. A table will appear illustrating details of the command arguments. Further, window 540 of screen shot 500 allows a SME or course developer to view the outputs of the line-commands in a text format.

Figure 6:
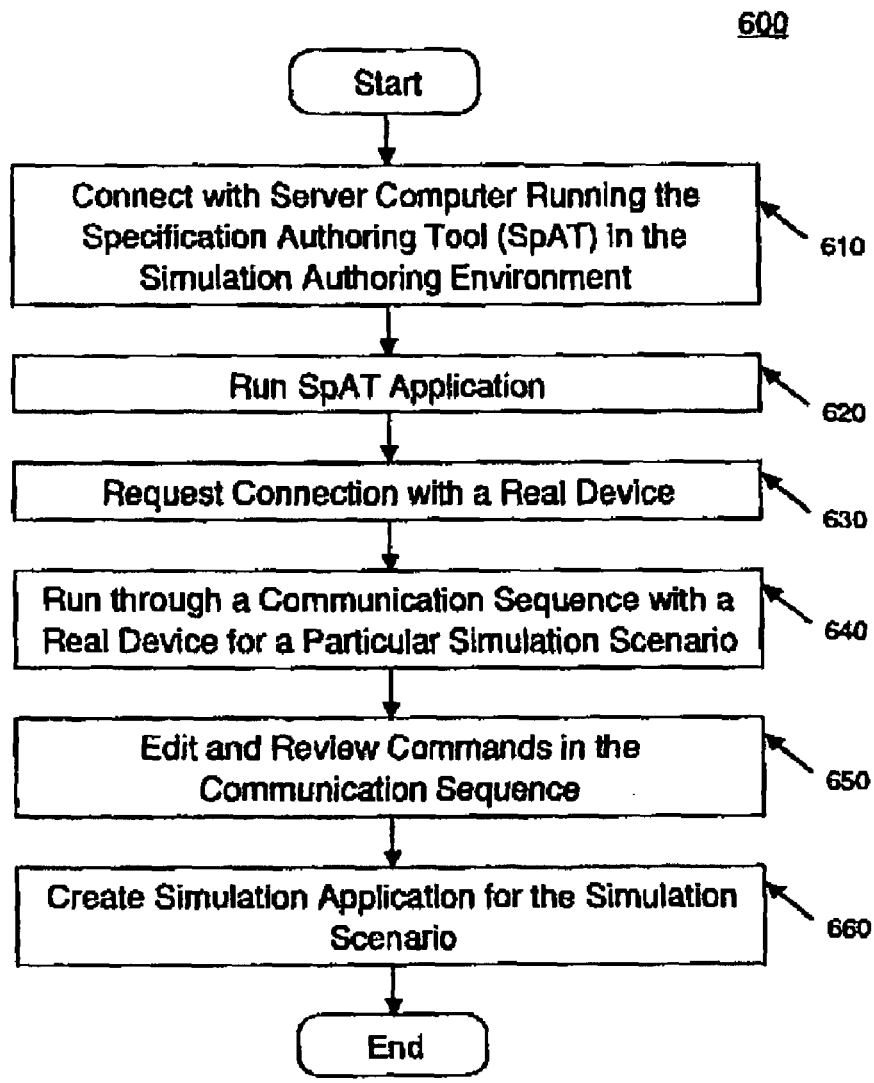
FIG. 6 is a flow diagram illustrating steps in a computer implemented method for creating a simulation application in a simulation authoring environment, in accordance with one embodiment of the present invention.
Figure 7:
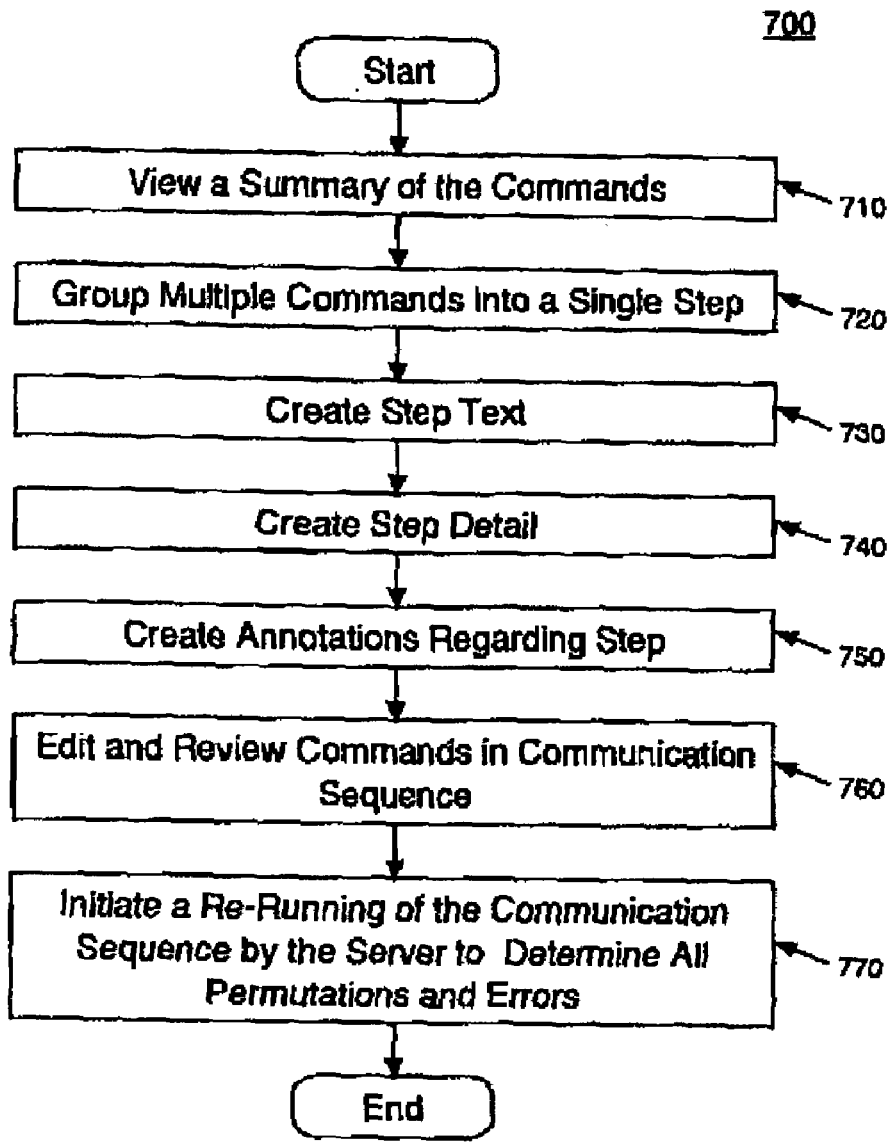
FIG. 7 is a flow diagram illustrating steps in a computer implemented method for creating a simulation application in a simulation authoring environment, in accordance with one embodiment of the present invention.

FIG. 6 illustrates an exemplary flow chart 600 for creating a simulation application from the viewpoint of a SME or course developer, in accordance with one embodiment of the present invention. Flow chart 600 begins with step 610 where a SME connects with a server computer that contains the SpAT tool or application that is capable of creating the simulation application. In one embodiment, the simulation authoring environment implements a Telnet connection between the end device, where the SME inputs the line-commands, and the server computer.

In step 620, the SME runs the SpAT tool in order for the communication between the SME and the network device to be processed by the server computer. Otherwise, the server computer merely passes the communication between the SME and the network device without any processing of the communication. The server computer downloads Java applets into the end device to provide an interface between the end device and the server computer. This interface facilitates the transfer of line-commands from the SME at the end device to the server computer. The server computer, in turn, uses the line-commands from the SME to interact with the network device.

In step 630, the SME requests a connection to a particular network device. It is important to note, that this connection is a real connection to a real device. The server computer can implement a Telnet connection to couple to the network device.

In step 640 of FIG. 6, the SME runs through an entire communication sequence with the server computer for a particular simulation scenario. The server computer takes the line-commands associated with the communication sequence and interfaces with the network device. The communication between the server computer and the network device is then stored and captured at the server computer for further processing.

In step 650 of flow chart 600, the communication is passed back to the SME at the end device for further editing and/or review. Additionally, throughout the process, the outputs to the line-commands as entered by the SME are returned to the end device to prompt the SME for further line-commands.

In step 660 of flow chart 600, after the entire communication sequence has been run through one time, the server computer can create the simulation application that focuses on the real scenario of interest. The SpAT tool located at the server computer in the simulation authoring environment has the intelligence to run through all the permutations in the communication sequence, disregard invalid permutations, and create the simulation application.

Flow chart 700 provides a more detailed view of the process used to create a simulation application in the simulation authoring environment, in accordance with one embodiment of the present invention. Flow chart 700 illustrates the process from the viewpoint of the SME or course developer that implements the simulation authoring environment to create a simulation application. Flow chart 700 is a more detailed view of steps 650 and 660 of flow chart 600.

Flow chart 700 begins with step 710 where a SME views the summary of the commands that were executed in a particular communication scenario as inputted by the SME. In one implementation, the summary is presented to the SME at the end device by the server computer in the form of a table, as in table 300.

In step 720 of flow chart 700, the SME groups the line-commands into a series of steps. As discussed previously, the steps must be performed in a linear manner; however, the group of line-commands contained within each of the steps need not be performed in a linear manner. The server computer takes the grouping and implements these into the tutorial exercise associated with the simulation application that is being created in flow chart 700.

In step 730 of flow chart 700, the SME enters the step text into the simulation application. In step 740, the SME enters the step detail into the simulation application. The step text is a technical description of the step. The step detail provides instructions and information to a student user of the simulation application to help navigate through the particular step in the communication sequence. The server computer takes the step text and step detail and incorporates them into the tutorial exercise associated with the simulation application.

In step 750, the server computer allows the SME or the course developer to make annotations regarding the simulation application. These annotations are used for reference in aiding the SME to create the simulation application. The annotations are not incorporated by the server computer into the simulation application. For example, if the course developer wanted to change a parameter in a particular step for an exam being created in the simulation application, the developer could annotate this change in the notes.

In step 760, the server computer allows the SME to edit and review the line-commands in the communication sequence. At this point, the SME can change parameters used in the line-commands or even add new line-commands into the series of steps in the communication sequence. The edited line-commands are substituted into the communication sequence for the line-command that was edited. Additionally, the new line-commands are incorporated into the communication sequence at the server.

In step 770 of flow chart 700, the SME hands over the process to the sever computer to create the simulation application. The server computer, in step 770, automatically re-runs the communication sequence using the latest line-commands stored at the server computer. The server computer interacts with the network device independent of the SME or the end device. The executed line-commands in the communication sequence includes the edited line-commands and the new line-line commands.

In step 770, the server computer is collecting further data in order to replicate further situations that could conceivably be encountered by a student using the simulation application. The server computer has the intelligence to run through all the possible permutations available in the communication sequence and to gather the outputs relating the specific line-command for that permutation. These outputs for the various permutations are incorporated into the simulation application.

Also, in step 770, the server computer has the intelligence to query the network device for the full syntax of the line-command as entered by the SME. Usually, to save time, the SME will input line-commands that are abbreviated; however, while the SME understands the meaning of the abbreviation, the student user of the simulation application may not understand the abbreviation. Thus, the simulation application presents line commands with their full syntax.

Furthermore, the server computer has the intelligence to recognize invalid line-commands and errors in the line-commands. This is possible since the server computer provides an intelligent link between the end device and the network device.

Figure 8:
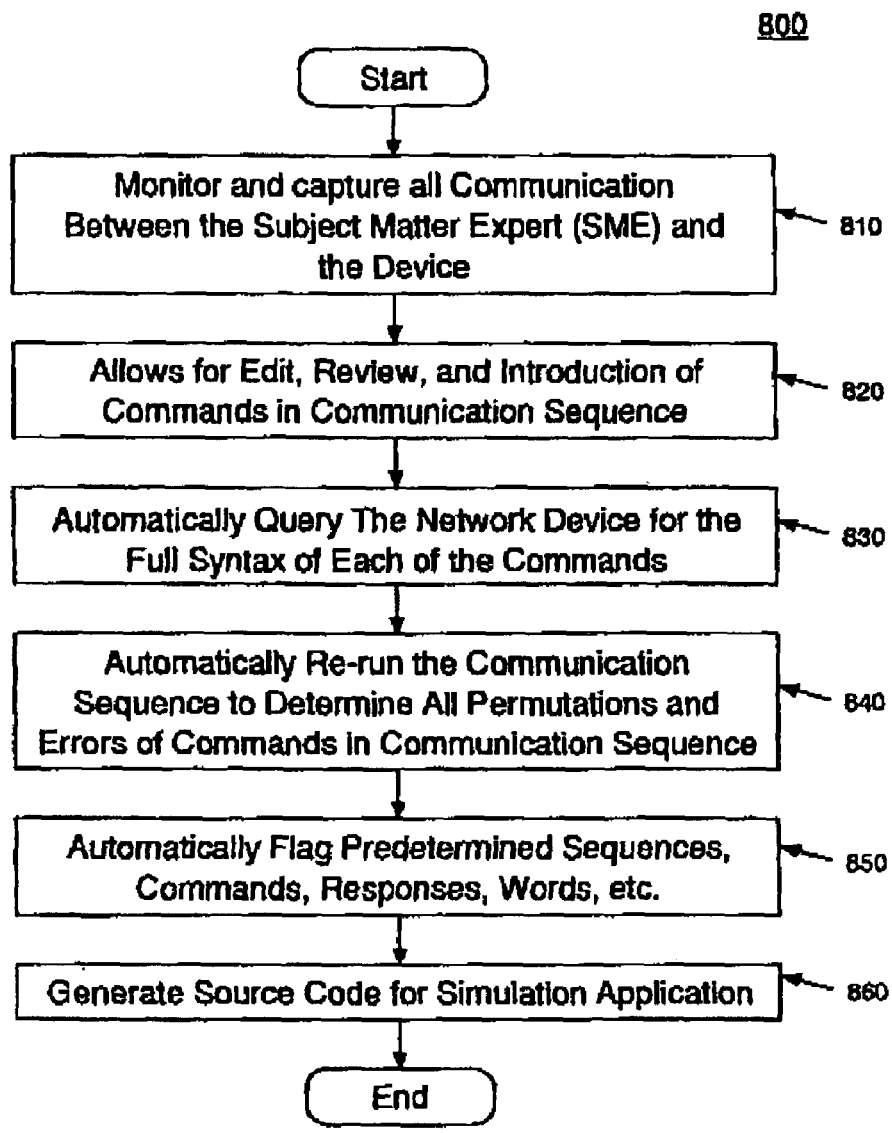
FIG. 8 is a flow diagram illustrating steps in a computer implemented method for creating a simulation application in a simulation authoring environment, in accordance with one embodiment of the present invention.

FIG. 8 illustrates an exemplary flow chart 800 for creating a simulation application in a simulation authoring environment, in accordance with one embodiment of the present invention. Flow chart 800 begins with step 810, where a sever computer automatically monitors the communication between an end device and a real device during a communication sequence. The communication in the communication sequence includes line-commands inputted by a SME at the end device. The line-commands are directed to the real device, e.g., a network device. The server computer also automatically monitors the outputs from the real device associated with each of the line-commands.

In step 810 of flow chart 800, the server computer also automatically captures the communication between the end device and the real device. The captured communication is used to create the simulation application.

In step 820, the server computer allows for the editing of the line-commands. This editing includes the changing of parameters within the line-command, correcting errors, changing the placement of the line-command within the communication sequence, the introduction of new line-commands into the communication sequence, etc. The line-commands within the communication sequence reflect the edited line-commands and the new line-commands.

After the SME has performed the steps in flow charts 600 and 700, the server computer in step 830 automatically query the network device for the full syntax of the each of the line-commands, as entered by the SME or the course developer. Also, the server computer has the intelligence to recognize and disregard invalid line-commands. The server computer can also notify the SME of the invalid line-commands and give an explanation as to its invalidity.

The server computer then automatically re-runs the communication sequence in step 840. The line commands in the communication sequence includes the edited line-commands and the new line-commands. At this time, the server computer determines all the various valid permutations for the communication sequence. Since the permutations can be broken down in to each of the steps of the communication sequence, the server computer determines all the permutations for each of said series of steps. Each of the valid permutations comprises a unique combination and order of line-commands and their corresponding outputs from the real service.

In step 850 of flow chart 800, the server computer has the intelligence to automatically flag predetermined command-lines, words, outputs, etc. The flagged items can be further processed to include a hyperlink to other sites that provide definitions or explanations of the flagged item.

In step 860 of flow chart 800, the server computer automatically generates a simulation application based on the communication associated with the communication sequence. The simulation application is able to present an identical output from the real device that corresponds to a particular line-command in the communication sequence.

The simulation application can be in the form of an exercise that simulates a real-life interaction with the real device. The simulation application presents real-life outputs to command-line inputs into said real device in a simulated and virtual environment. The real-life outputs are presented along with the step text and said step detail in an instructional exercise format.

In another embodiment of the present invention, the SME interfaces with a network device using a graphical protocol, such as that used typically in web browser interfaces. The methods as described in flow charts 600, 700, and 800 are easily implemented to create a simulation application that focuses on the interactions between a user and a content provider at a web site. For a simple example, a simulation can be created to address the operating principles encountered when interacting with a retail web site. The simulation application can provide a walk through of the screens encountered when selecting and purchasing a particular item through the web site.

While the methods of embodiments illustrated in flow charts 600, 700, and 800 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

The instructions for the steps, and the data input and output from the steps of flow charts 600, 700, and 800 may be implemented utilizing processor 201 and ROM memory 203 and RAM memory 202, as shown in FIG. 2. Furthermore, other types of memory storage can be utilized to accomplish the aforementioned such as a hard drive, a CD ROM, flash memory, or any compact integrated circuit memory storage device.

The preferred embodiment of the present invention, a method and system for a simulation authoring environment, is thus described. While the present invention has been described in particular embodiments, it should be appreciated that the present invention should not be construed as limited by such embodiments, but rather construed according to the below claims.

What is claimed is:

1. A method for creating a simulation comprising:
    monitoring communication between an end device and a real device during a communication sequence, said communication comprising a plurality of line-commands from said end device that are directed to said real device, and a plurality of outputs from said real device, each of said plurality of outputs generated in response to one of said plurality of line-commands;
    capturing said communication between said end device and said real device; an
    generating a simulation application for simulating an output of said real device based on said communication associated with said communication sequence, said simulation application able to present an identical output from said real device that corresponds to a particular line-command from said plurality of line-commands.

2. The method as described in claim 1, wherein said method comprises:
    summarizing said plurality of line commands in a summary list, said summary list comprising each of said plurality of line-commands as inputted into said real device along with a corresponding description.

3. The method as described in claim 1, wherein said method comprises:
    grouping said plurality of line-commands into a series of steps, each of said series of steps comprising at least one line-command from said plurality of line-commands.

4. The method as described in claim 1 wherein said method comprises:
    editing of said plurality of line-commands, said plurality of line-commands reflecting and including edited line-commands.

5. The method as described in claim 4, wherein said method comprises:
    introducing new line-commands into corresponding steps from said series of steps.

6. The method as described in claim 5, wherein said method comprises:
   providing step text for each of said series of steps, said step text including a short description associated with a corresponding step from said series of steps; and
   providing step detail for each of said series of steps, said step detail including detailed instructions and information associated with a corresponding step from said series of steps.

7. The method as described in claim 6, wherein said method comprises:
   re-running said communication sequence, such that said plurality of line-commands are inputted into said real device, said plurality of line-commands including edited line-commands and said new line-commands.

8. The method as described in claim 7, wherein said method comprises:
   checking for invalid line-commands.

9. The method as described in claim 8, wherein said method comprises:
   determining all permutations for each of said series of steps, wherein each permutation comprises a unique combination and order of line-commands and their corresponding outputs from said real device.

10. The method as described in claim 9, wherein said simulation application is an exercise that simulates a real-life interaction with said real device, said simulation application presenting realistic outputs to command-line inputs into said real device in a simulated environment, said realistic outputs corresponding to said plurality of outputs as determined by said method, said realistic outputs presented along with said step text and said step detail in an instructional exercise format.

11. The method as described in claim 9, wherein said method is performed at a server coupled to said end device and said real device.

12. A method for creating a simulation comprising:
   monitoring communication between an end device and a real device during a communication sequence, said communication sequence relating to a real-life interaction with said real device, said communication comprising a plurality of inputs from said end device that is directed to said real device, and a plurality of outputs from said real device to said plurality of inputs, each of said plurality of outputs generated in response to one of said plurality of inputs;
   capturing said communication between said end device and said real device;
   determining all permutations for said communication sequence, forming a plurality of permutations for said communication sequence, each of said plurality of permutation comprising a unique combination and order of inputs and their corresponding outputs; and
   generating a simulation application for simulating an output of said real device based on said communication associated with said communication sequence, said simulation application able to present an identical output to a particular input corresponding to a particular permutation for said communication sequence.

13. The method as described in claim 12, wherein said method comprises:
   checking for invalid inputs in said plurality of inputs; and
   providing notification at said end device of said invalid inputs.

14. The method as described in claim 12, wherein said method comprises:
   flagging predetermined items of interest; and
   providing notification at said end device of said predetermined items of interest.

15. The method as described in claim 12, wherein said method comprises:
   querying said real device for the full syntax of each input in said plurality of inputs; and
   replacing each input with their corresponding full syntax.

16. The method as described in claim 12, wherein said method is performed at a server coupled to said end device and said real device.

17. The method as described in claim 12, wherein said real device is any Internet network device.

18. The method as described in claim 12, wherein said real device is an Internet content provider.

19. The method as described in claim 12, wherein said communication is in the form of a command-line interface with line-commands, each of said plurality of inputs corresponding to one of a plurality of line-commands.

20. The method as described in claim 19, wherein said method comprises:
   grouping said plurality of line-commands into a series of steps, each of said series of steps comprising at least one line-command from said plurality of line-commands;
   editing of said plurality of line-commands, said plurality of line-commands reflecting and including edited line-commands;
   introducing new line-commands into corresponding steps from said series of steps;
   providing step text for each of said series of steps, said step text including a short description associated with a corresponding step from said series of steps;
   providing step detail for each of said series of steps, said step detail including detailed instructions and information associated with a corresponding step from said series of steps;
   re-running said communication sequence, such that said plurality of line-commands are inputted into said real device, said plurality of line-commands including edited line-commands and said new line-commands;
   checking for invalid line-commands: and
   automatically determining all permutations for each of said series of steps, wherein each permutation comprises a unique combination and order of line-commands and their corresponding outputs from said real device.

21. The method as described in claim 20, wherein said simulation application is a computer based exercise that simulates said real-life interaction with said real device, said simulation application presenting real-life outputs to command-line inputs into said real device in a simulated environment, said real-life outputs as determined by said method, said real-life outputs presented along with said step text and said step detail in an instructional exercise format.

22. A computer system comprising a processor, a memory unit, and a display screen wherein said memory contains instructions that when executed are operable to:
   monitor communication between an end device and a real device during a communication sequence, said communication comprising a plurality of line-commands from said end device that are directed to said real device, and a plurality of outputs from said real device, each of said plurality of outputs generated in response to one of said plurality of line-commands;
   capture said communication between said end device and said real device; and generate a simulation application for simulating an output of said real device based on said communication associated with said communication sequence, said simulation application able to present an identical output from said real device that corresponds to a particular line-command from said plurality of line-commands.

23. The computer system as described in claim 22, wherein the instructions when executed are further operable to:
summarize said plurality of line commands in a summary list, said summary list comprising each of said plurality of line-commands as inputted into said real device along with a corresponding description.

24. The computer system as described in claim 22, wherein the instructions when executed are further operable to:
group said plurality of line-commands into a series of steps, each of said series of steps comprising at least one line-command from said plurality of line-commands.

25. The computer system as described in claim 22, wherein the instructions when executed are further operable to:
edit said plurality of line-commands, said plurality of line-commands reflecting and including edited line-commands.

26. The computer system as described in claim 25, wherein the instructions when executed are further operable to:
introduce new line-commands into corresponding steps from said series of steps.

27. The computer system as described in claim 26, wherein the instructions when executed are further operable to:
provide step text for each of said series of steps, said step text including a short description associated with a corresponding step from said series of steps; and
provide step detail for each of said series of steps, said step detail including detailed instructions and information associated with a corresponding step from said series of steps.

28. The computer system as described in claim 27, wherein the instructions when executed are further operable to:
re-run said communication sequence, such that said plurality of line-commands are inputted into said real device, said plurality of line-commands including edited line-commands and said new line-commands.

29. The computer system as described in claim 28, wherein the instructions when executed are further operable to:
check for invalid line-commands.

30. The computer system as described in claim 29, wherein the instructions when executed are further operable to:
determine all permutations for each of said series of steps, wherein each permutation comprises a unique combination and order of line-commands and their corresponding outputs from said real device.

31. The computer system as described in claim 30, wherein said simulation application is an exercise that simulates a real-life interaction with said real device, said simulation application presenting real-life outputs to command-line inputs into said real device in a simulated environment, said real-life outputs corresponding to said plurality or outputs as determined, said real-life outputs presented along with said step text and said step detail in an instructional exercise format.

32. The computer system as described in claim 30, wherein the computer system is coupled to said end device and said real device.

33. A computer-readable medium comprising computer-executable instructions that when executed are operable to:
monitor communication between an end device and a real device during a communication sequence, said communication comprising a plurality of line-commands from said end device that are directed to said real device, and a plurality of outputs from said real device, each of said plurality of outputs generated in response to one of said plurality of line-commands;
capture said communication between said end device and said real device; and
generate a simulation application for simulating an output of said real device based on said communication associated with said communication sequence, said simulation application able to present an identical output from said real device that corresponds to a particular line-command from said plurality of line-commands.

34. The computer-readable medium as described in claim 33, wherein the computer-executable instructions are further operable to:
summarize said plurality of line commands in a summary list, said summary list comprising each of said plurality of line-commands as inputted into said real device along with a corresponding description.

35. The computer-readable medium as described in claim 33, wherein the computer-executable instructions are further operable to:
group said plurality of line-commands into a series of steps, each of said series of steps comprising at least one line-command from said plurality of line-commands.

36. The computer-readable medium as described in claim 33, wherein the computer-executable instructions are further operable to:
edit said plurality of line-commands, said plurality of line-commands reflecting and including edited line-commands.

37. The computer-readable medium as described in claim 36, wherein the computer-executable instructions are further operable to:
introduce new line-commands into corresponding steps from said series of steps.

38. The computer-readable medium as described in claim 37, wherein the computer-executable instructions are further operable to:
provide step text for each of said series of steps, said step text including a short description associated with a corresponding step from said series of steps; and
provide step detail for each of said series of steps, said step detail including detailed instructions and information associated with a corresponding step from said series of steps.

39. The computer-readable medium as described in claim 38, wherein the computer-executable instructions are further operable to:
automatically re-run said communication sequence, such that said plurality of line-commands are inputted into said real device, said plurality of line-commands including edited line-commands and said new line-commands.

40. The computer-readable medium as described in claim 39, wherein the computer-executable instructions are further operable to:
  check for invalid line-commands.

41. The computer-readable medium as described in claim 40, wherein the computer-executable instructions are further operable to:
  determine all permutations for each of said series of steps, wherein each permutation comprises a unique combination and order of line-commands and their corresponding outputs from said real device.

42. The computer-readable medium as described in claim 41, wherein said simulation application is an exercise that simulates a real-life interaction with said real device, said simulation application presenting real-life outputs to command-line inputs into said real device in a simulated environment, said real-life outputs corresponding to said plurality of outputs as determined, said real-life outputs presented along with said step text and said step detail in an instructional exercise format.

43. The computer-readable medium as described in claim 41, wherein the computer-readable medium is stored on a server coupled to said end device and said real device.

44. A simulation generating mechanism for creating a simulation comprising:
  means for monitoring communication between an end device and a real device during a communication sequence, said communication comprising a plurality of line-commands from said end device that are directed to said real device, and a plurality of outputs from said real device, each of said plurality of outputs generated in response to one of said plurality of line-commands;
  means for capturing said communication between said end device and said real device; and
  means for generating a simulation application for simulating an output of said real device based on said communication associated with said communication sequence, said simulation application able to present an identical output from said real device that corresponds to a particular line-command from said plurality of line-commands.

45. The simulation generating mechanism as described in claim 44, further comprises:
  means for summarizing said plurality of line commands in a summary list, said summary list comprising each of said plurality of line-commands as inputted into said real device along with a corresponding description.

46. The simulation generating mechanism as described in claim 44, further comprising:
  means for grouping said plurality of line-commands into a series of steps, each of said series of steps comprising at least one line-command from said plurality of line-commands.

47. The simulation generating mechanism as described in claim 44, further comprising:
  means for editing of said plurality of line-commands, said plurality of line-commands reflecting and including edited line-commands.

48. The simulation generating mechanism as described in claim 47, further comprising
  means for introducing new line-commands into corresponding steps from said series of steps.

49. The simulation generating mechanism as described in claim 48, further comprising:
  means for providing step text for each of said series of steps, said step text including a short description associated with a corresponding step from said series of steps; and
  means for providing step detail for each of said series of steps, said step detail including detailed instructions and information associated with a corresponding step from said series of steps.

50. The simulation generating mechanism as described in claim 49, further comprising:
  means for re-running said communication sequence, such that said plurality of line-commands are inputted into said real device, said plurality of line-commands including edited line-commands and said new line-commands.

51. The simulation generating mechanism as described in claim 50, further comprising:
  means for checking for invalid line-commands.

52. The simulation generating mechanism as described in claim 51, further comprising:
  means for determining all permutations for each of said series of steps, wherein each permutation comprises a unique combination and order of line-commands and their corresponding outputs from said real device.

53. The simulation generating mechanism as described in claim 52, wherein said simulation application is an exercise that simulates a real-life interaction with said real device, said simulation application presenting real-life outputs to command-line inputs into said real device in a simulated environment, said real-life outputs presented along with said step text and said step detail in an instructional exercise format.

* * * * *